3,679,626
THERMOPLASTIC TRAFFIC PAINTS AND PROCESS FOR THE MANUFACTURE THEREOF
Toshimi Tanekusa, Fujisawa-shi, Hideaki Takasawa, Yokohama, and Achihiko Yamahata, Tokyo, Japan, assignors to Nippon Paint Co., Ltd., Osaka, Japan
No Drawing. Filed June 23, 1967, Ser. No. 648,210
Claims priority, application Japan, July 21, 1966,
41/47,356
Int. Cl. C08f *45/04*; E01c *23/16*
U.S. Cl. 260—41 A                                       1 Claim

ABSTRACT OF THE DISCLOSURE

A process for manufacturing a thermoplastic traffic marking paint including the steps of mixing at room temperature a liquid plasticizer and a nucleus component to coat the nucleus with the plasticizer, and thereafter adding to said mixture a thermoplastic resin, a pigment and additive ingredients selected from an aggregate of silica sand, glass spheres, a lubricant, an antioxidant, an antiblocking agent and mixtures thereof, to form a uniform powdered mixture which is easily melted on heating to form a fast drying marking material which is easily applied to a road surface and has good shock resistance, adherence, cold resistance and abrasion resistance characteristics.

---

The present invention relates to a process for manufacturing thermoplastic traffic paints at ordinary temperature which comprises adding a liquid or semi-liquid plasticizer to a relatively coarse particulate nucleus component without heating, mixing them uniformly by thorough stirring and then adding a powdery resin, a pigment and other additives and thoroughly stirring the mixture.

The increase of road traffic has promoted the demand for thick film type thermoplastic marking materials having a long life instead of previous solvent type traffic marking materials containing an alkyd resin, an alkyd resin-chlorinated rubber, a vinyl resin, etc. as a vehicle. These thermoplastic materials are characterized in that they solidify in 2 to 3 minutes and have a long life as line. However, the thermoplastic materials have a disadvantage that they have a slow application speed as they are used by preheating them into a liquid form and then applying by gravity flow, for example, using the applicator described in U.S. Pat. No. 3,018,704.

In the manufacture of the thermoplastic materials, also, uniform products have been heretofore obtained by mixing a molten vehicle with an aggregate of silica sand, glass sphere, etc., a plasticizer such as dioctyl phthalate, epoxide soybean oil, etc., a resin such as a cumarone-indene resin, a petroleum resin and a pigment at a high temperature.

The manufacture has required a large equipment and a long time heating, and has suffered from an economical problem as well as the deterioration of the marking materials by heating. Moreover, the manufacture has required a dangerous operation at a high temperature.

The thermoplastic marking material which is now used can solidify fast and the resulting coating has a good durability. However, said material is disadvantageous in that it must be applied at a slow speed. On the other hand the hot spray type high viscosity marking materials, which have a fast application speed and become tack-free immediately have a disadvantage that their life is short.

In order to obtain uniform products, the process for producing such thermoplastic marking materials has been heretofore carried out by melting a resin such as cumarone-indene resin, a petroleum resin etc. at a high temperature, adding an aggregate of silica sand, glass sphere, etc., a plasticizer such as dioctyl phthalate, epoxy soybean oil, etc. and a pigment such as titanium dioxide successively, stirring the mixture to homogenize and recovering the product as blocks and, if necessary, pulverizing the blocks. According to this process, the production cost is high as the process requires a large equipment and a long time to melt the resin materials at a high temperature and mix the materials uniformly. Moreover, the process contains a dangerous operation at a high temperature.

The resultant product must be melted again at a high temperature on its application. Then a fairly long time is required to melt the product uniformly. Since the product is applied by an applicator such as described in U.S. Pat. No. 3,018,704 as mentioned above, the application speed is slow. Accordingly, it takes a long time to apply the product and the repeated heating of the material at a high temperature for a long period of time causes the deterioration and the discoloration of the film.

An object of the present invention is to provide a simple and economical process for producing thermoplastic marking materials.

Thus, the present invention relates to a process for producing thermoplastic traffic paints which comprises mixing a resin, a pigment, a plasticizer, etc. which are the constituents of the paints uniformly at normal temperatures with stirring.

The process of the present invention comprises at least two steps of mixing part of the resin, pigment and lubricant with a liquid material with thorough stirring to homogenize and then adding the remaining materials to the mixture and stirring the mixture to form a powdery product.

For convenience the materials used in the present invention are classified as follows:

(1) "Nucleus component," this term meaning herein the pellets, beads, granules, etc. of the aggregate of silica sand or glass sphere having a particle size of about 20 to 200 mesh (U.S. Sieve), etc. materials which can be used as the nucleus component are those having a large particle size and which do not absorb liquid component in a short time to form agglomerates or viscid lumps when mixed with the liquid component.

(2) "Resin component," this term meaning herein powdery EVA or EEA, powder and block terpene, ester gum, cumarone-indene, petroleum, modified and maleic resins, etc. This component tends to absorb the liquid component in a short time to form viscid lumps.

(3) "Liquid component," this term meaning herein resinous plasticizers such as polybutene, polyterpene, etc. and plasticizers such as liquid dioctyl phthalate, chlorinated diphenyl, epoxide soybean oil, non-drying oils such as castor oil, semi-drying oils such as soybean oil and drying oils such as linseed oil.

(4) "Pigment component," this term meaning herein titanium dioxide, zinc oxide, calcium carbonate, chrome yellow, etc. This component tends to cause agglomeration when contacted with a small amount of the liquid component.

(5) "Additive component," this term meaning herein lubricants such as paraffine wax, polyethylene wax, other synthetic waxes, etc. and a very small amount of antioxidants, antiblocking agents, etc.

Thus, the starting materials used in the present invention comprises "nucleus component," "resin component," "liquid component," "pigment component" and "additive component."

From the standpoint of the constitution of the coating materials, one or more members selected from the group consisting of EVA and EEA in the form of pellet, bead or granule and powdery or lumpy thermoplastic resins, which have been heretofore used, such as terpene resins, ester gums, cumarone-indene resins, petroleum resins, modified resins, etc. are used as a vehicle. If necessary, EVA or EEA may be used together with the above rigid thermoplastic resins because EVA or EEA is a relatively flexible resin. The amount of EVA or EEA used is suitably 3 to 30 percent by weight based on the weight of the coating materials, because the use of a larger amount of EVA or EEA has a detrimental effect on the easy spraying operation and the prevention of dirtying. The above vehicle has generally an excellent thermal resistance, but it is feared that the heating for a long period of time in the manufacture and the repeated heating in the application may cause the deterioration of the product.

The silica sand having a particle size of about 65 to 200 mesh (U.S. Sieve) and glass sphere having a particle size of about 20 to 200 mesh (U.S. Sieve) which are classified in "nucleus component" serve not only to afford film strength but also to give night visibility.

It is necessary for marking a road surface that the pigment component including coloring materials such as titanium white, chrome yellow, etc. and fillers such as calcium carbonate contains 5 percent by weight or more of the coloring pigment based on the whole coating material. Silica sand and glass sphere may be used in the nucleus component to afford durability or night reflection, if necessary. These materials may be used in a large amount as they have a little oil absorption. However, if the total amount of these materials and the pigment component exceeds 80 percent by weight, based on the weight of the whole coating material, the adhesive strength to a road surface will be reduced.

The plasticizers used as "liquid component" in the present invention include resinous plasticizers which are effective as both resin and plasticizer such as polybutene, polyterpene, etc., liquid dioctyl phthalate, chlorinated diphenyl and epoxidized soybean oil, non-drying oils, such as castor oil, semi-drying oils, such as soybean oil and drying oils, such as linseed oil, which are added to improve the flexibility, shock resistance and adherence to a road surface of EVA, EEA or a thermoplastic resin. Soybean oil, linseed oil, etc. are not thermoplastic, but can be handled in the same manner as thermoplastic materials as their change caused by heating for spraying is little. They are effective in affording the adherence of the film and the prevention of staining as the resultant film is dried gradually on a road surface after cooling and hardening. The amount of these materials used is such an amount that the hardening of the film may not be delayed, that is, an effective amount as a plasticizer.

"Resin component" which is a vehicle may be a terpene resin, an ester gum, a petroleum resin, a modified resin or another thermoplastic resin. However, as their cold resistance, shock resistance and particularly flexibility are unsatisfactory, powdery EVA or EEA is used, if necessary, or EVA and EEA in the form of pellet, bead or granule may be used together. When the amount of the whole resin including the resin component, EVA and EEA is 30 to 70 percent by weight, based on the weight of paint, an excellent traffic marking paint is obtained.

The additive component is the materials which are added if necessary. Among them a lubricant such as polyethylene, paraffin wax, etc. usually in the form of pellet or granule is important. The lubricant is added to reduce the viscosity of the product on heating and make the product sprayable particularly when EVA or EEA is contained. The amount of the lubricant used is suitably 5 to 30 percent by weight, based on the weight of paint, depending on the kind and amount of the pigment, resin and plasticizer used as materials.

In order to prevent the deterioration of the vehicle on the application of the product and the tackiness of the film, an antioxidant and antiblocking agent such as paraffin wax, stearic acid amide, etc. may be added to the vehicle as the additive component if required.

Traffic paints have been heretofore produced by heating the above-mentioned components at a high temperature and mixing them with stirring, but the present invention provides a process for producing traffic paints simply in a shortest time without suffering from the deterioration caused by heat.

The whole amount of liquid component is first added to part or all of nucleus component. This order of addition may be reversed. It is important to mix the nucleus component with the liquid component first.

The mixing of the nucleus component with the liquid component is completed so that the nucleus component may be coated with the liquid component. If the amount of the liquid component is remarkably smaller than that of the nucleus component, it takes a long time to complete the mixing. In such a case, part of the nucleus component may be mixed with the whole amount of the liquid component and the remaining nucleus component may be added in the next process in order to facilitate the mixing operation and to obtain a uniform mixture.

If the amount of the liquid component is larger, the whole amount of the nucleus component may be mixed with part of the liquid component uniformly and the remaining liquid component may be added in the next process.

In the above processes 3 to 75 percent by weight, based on the weight of paint of nucleus component and 1 to 20 percent by weight of liquid component are most suitable from the standpoint of manufacturing technique and the quality of the product.

In the next process, it is unnecessary to prescribe the order of addition. For example, the remaining resin component, the pigment component and the remaining additive component are successively added to the mixture of the nucleus component and the liquid component with stirring. In the present process, the mixing may be conducted at a somewhat higher temperature than normal temperatures so far as the resin is not rendered tacky.

The product obtained by the present process is powdery and is very easy to handle on application. Thus it is possible to melt the material in a short time.

Any of a kneader, an edge runner, a ball mill, a conical mixer and a V type mixer may be used as an apparatus for the manufacture.

In mixing the nucleus component with the liquid component, the following combinations are intended according to the kind of nucleus component.

(1) Liquid component is added to the aggregate of silica sand or glass sphere.

(2) Liquid component is added to a lubricant (polyethylene wax or paraffin wax) in the form of a pellet or granule.

The compositions are hot-sprayable. For example, when the hot-spray type traffic paints of the present invention are melted at 100° to 250° C. in a spray applicator equipped with a heating means and applied on a road surface by the spray, an excellent pattern can be obtained. The optimum viscosity of the paints for the spray is 700±50 centipoise at 180° C.

The materials cool down and solidify in 2 to 3 minutes. The resultant film is very flexible and superior to any prior thermoplastic marking material in shock resistance, adherence, cold resistance, abrasion resistance.

The present invention has permitted the prevention of the deterioration caused by repeated heating and the provision of cheap traffic marking materials by producing the materials which rapidly solidify and have a fast application speed and a long life by a simple method.

It is also obvious that the present invention may be applied to general thermoplastic materials. If the materials melt under the condition of application and can be classified into nucleus component, liquid component, etc. as in the present invention, the process can be shortened by the present process.

The following examples illustrate the present invention. In each of the examples the manufacture was carried out at ordinary temperature using a kneader.

EXAMPLE 1

| | Parts by wt. |
|---|---|
| Glass sphere | 20.0 |
| D.O.P. | 4.0 |
| Ethylene-vinyl acetate copolymer (powder) | 15.0 |
| Polyethylene wax | 3.0 |
| Ester gum | 38.0 |
| Titanium white | 10.0 |
| Paraffin wax | 10.0 |
| Total | 100.0 |

Using the above recipe, D.O.P. was added to glass sphere. The mixture was stirred so that the glass sphere may be coated with D.O.P. uniformly. An ethylene-vinyl acetate copolymer in the form of powder, polyethylene wax, an ester gum, titanium white and paraffin wax were then added to the mixture successively. Thus, a uniform product was obtained.

EXAMPLE 2

| | Parts by wt. |
|---|---|
| Glass sphere | 30.0 |
| Silica sand | 30.0 |
| Linseed oil | 6.0 |
| Maleic resin | 16.0 |
| Titanium dioxide | 10.0 |
| Talc | 8.0 |
| Total | 100.0 |

Using the above recipe, linseed oil was added to glass sphere and silica sand. The mixture was stirred so that the glass sphere and silica sand may be coated with linseed oil uniformly. Maleic resin in the form of powder, titanium dioxide and talc were then added to the mixture successively. Thus, a uniform product was obtained.

EXAMPLE 3

| | Parts by wt. |
|---|---|
| Silica sand | 60.0 |
| Linseed oil | 4.0 |
| Maleic resin | 14.0 |
| Titanium dioxide | 10.0 |
| Talc | 12.0 |
| Total | 100.0 |

Using the above recipe, linseed oil was added to silica sand. The mixture was stirred so that the silica sand may be coated with linseed oil uniformly. Maleic resin in the form of powder, titanium dioxide and talc were then added to the mixture successively. Thus, a uniform product was obtained.

What we claim is:

1. A process for manufacturing a thermoplastic traffic marking paint, said paint being comprised of (1) about 14-16% by weight of a thermoplastic resin, (2) about 1-20% by weight of a liquid plasticizer, (3) a pigment, and (4) an additive ingredient selected from an aggregate of silica sand having a particle size of about 65 to 200 mesh, U.S. sieve, glass spheres having a particle size of about 20 to 200 mesh, U.S. sieve, a lubricant, an antioxidant, and an antiblocking agent, and mixtures thereof; wherein about 3-75% by weight of said ingredients is in the form of relatively large particles selected from pellets, beads, and granules and constituting a nucleus component selected for the group consisting of said aggregate of silica sand and said glass spheres, the steps comprising:

first adding said liquid plasticizer at one time to said nucleus component with mixing, but without heating or melting, to coat said nucleus component with said plasticizer, and thereafter adding to said admixture the thermoplastic resin, the pigment and the additive ingredient other than used as the nucleus component, to form a uniform powdered admixture which upon heating is easily melted to a fast drying marking material easily applied to a road surface and having good shock resistance, adherence, cold resistance, and abrasion resistance characteristics.

References Cited
UNITED STATES PATENTS

| | | | |
|---|---|---|---|
| 2,477,009 | 7/1949 | Sandler | 106—198 |
| 2,844,489 | 7/1958 | Gemmer | 117—20 |
| 3,275,494 | 9/1966 | Bruson | 260—28.5 AV |
| 3,417,040 | 12/1968 | Kremer | 260—28.5 AV |
| 3,325,431 | 6/1967 | McManus | 260—28.5 AV |
| 3,211,808 | 10/1965 | Young | 117—DIG 6 |

FOREIGN PATENTS

| 899,394 | 6/1962 | Great Britain. |
|---|---|---|

MORRIS LIEBMAN, Primary Examiner

P. R. MICHL, Assistant Examiner

U.S. Cl. X.R.

94—1.5; 260—28.5 R, 33.8 UA, 34.2, 41 AG